United States Patent [19]

Kuroki et al.

[11] Patent Number: 4,795,078
[45] Date of Patent: Jan. 3, 1989

[54] METHOD FOR PRODUCING A CLAD STEEL PIPE

[75] Inventors: Takanori Kuroki, Fukuoka; Toshio Yoshida, Koube, both of Japan

[73] Assignee: Kuroki Kogyosho Co., Ltd., Fukuoka, Japan

[21] Appl. No.: 863,820

[22] Filed: May 13, 1986

Related U.S. Application Data

[63] Continuation-in-part of Ser. No. 472,370, Mar. 4, 1983, abandoned.

[51] Int. Cl.⁴ .................................................. B23K 1/00
[52] U.S. Cl. ...................................... 228/131; 228/155; 228/175
[58] Field of Search ............... 228/131, 156, 175, 186, 228/193, 263.16, 263.15, 155

[56] References Cited

U.S. PATENT DOCUMENTS

| | | | |
|---|---|---|---|
| 2,820,286 | 1/1958 | Andrus | 228/175 |
| 3,141,234 | 7/1964 | De Geer, Jr. | 228/131 |
| 3,481,024 | 12/1969 | Bunn | 228/131 |
| 4,367,838 | 1/1983 | Yoshida | 228/156 |
| 4,518,111 | 5/1985 | Hardwick | 228/175 |
| 4,533,806 | 8/1985 | Kawasaki | 228/131 |
| 4,630,351 | 12/1986 | Kranz et al. | 228/155 |

FOREIGN PATENT DOCUMENTS 195590  12/1982  Japan .................................. 228/131

*Primary Examiner*—Kurt Rowan
*Attorney, Agent, or Firm*—Jordan and Hamburg

[57] ABSTRACT

A method for producing a clad steel pipe having resistance to corrosion and wear at the inner and/or the outer faces includes plural base pipes which are mechanically fixed and metallurgically joined by diffusion welding before the plural base pipes are elongated to produce an elongated clad steel pipe.

27 Claims, 3 Drawing Sheets

FIG·4
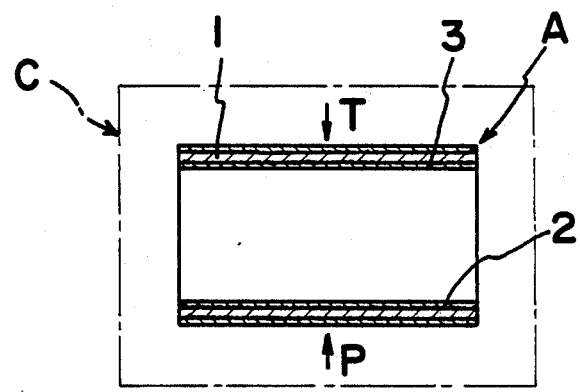
FIG·5
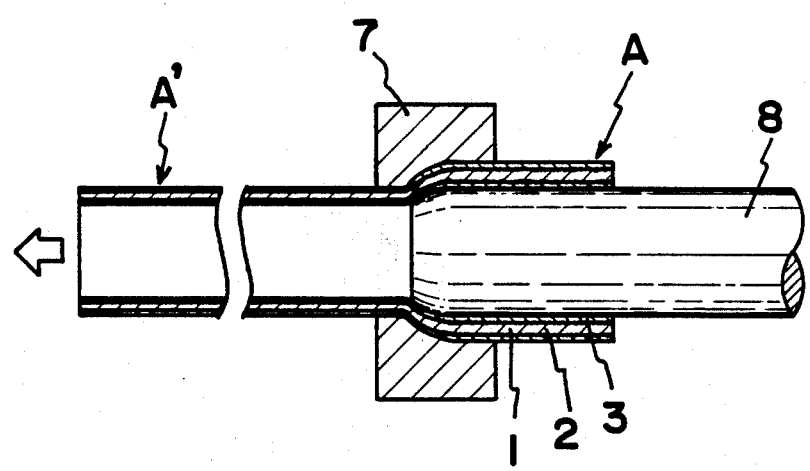

METHOD FOR PRODUCING A CLAD STEEL PIPE

This application is a continuation-in-part of application Ser. No. 472,370, filed Mar. 4, 1983, now abandoned.

BACKGROUND OF THE INVENTION

The present invention relates to a method for producing a clad steel pipe. Not only pressure tightness and heat resistance, but also corrosion resistance and wear resistance are indispensable to oil pipes or plant transferring pipes. A corrosion-resisting double walled pipe which is constructed of an inner pipe made of stainless steel and an outer pipe made of carbon steel is used for meeting such requirements. Both the inner pipe and the outer pipe should be tightly joined.

In the conventional method for producing this kind of a double walled pipe, the outer pipe is made of carbon steel and the inner pipe is made of stainless steel with both of them being joined by suitable ways such as a pip expansion method using hydro pressure, the edges of the pipe being seal-welded so as not to slide along the axis of the pipe.

A welded pipe was also heated at a high temperature and elongated by using a die and a mandrel or rolled and elongated by drawing.

In the above-mentioned method, however, heating to a high temperature at the time of rolling and application of machine power for, extruding and drawing was required. For instance, in the case of a double walled pipe made of carbon steel and stainless steel, the base pipes have to be kept at 1200° C. for a long time, so that there are disadvantages as regards the maintenance of the heating apparatus and the machinery and the requirement for expensive apparatus itself on a large scale. Furthermore, by using the above-mentioned conventional method, there are difficulties that scar or breakout in a pipe caused by the differences in the ductility and the deformation resistance at a high temperature between the dissimilar base metals which are joined together. Also, the bonding efficiency and the yield of products seem to be unsatisfactory.

SUMMARY OF THE INVENTION

It is an object of the present invention to provide a method for producing a clad steel pipe that shortens the producing process of the composite pipe, reduces the consumed energy, and increases accuracy of the joined faces by bonding the joined faces together metallurgically.

BRIEF DESCRIPTION OF THE DRAWINGS

FIG. 4 is a sectional view showing diffusion welding of the three-layer pipe, FIG. 5 is a sectional view showing the elongation of the three-layer pipe.

DETAILED DESCRIPTION OF THE PREFERRED EMBODIMENTS

The present invention relates to a method for producing a clad steel pipe which is metallurgically bonded together at the joined faces of the base pipes. Plural base pipes are fixed, at least the end parts of the mutual interfaces of the base pipes are seal-welded, and after that, this fixed pipe body is elongated and deformed along the axis of the pipe. In a method for producing the composite clad steel pipe with the necessary length, seal-welding is effected around the end parts of the mutual interfaces with the mutual interfaces of the plural base pipes of the above-mentioned pipe body being under a vacuum.

Next, the fixed pipe body is placed into a well-known diffusion welding apparatus such as a hot isostatic pressing apparatus, and the mutual interfaces of the plural base pipes are bonded by diffusion welding. After that, the welded pipe is elongated and deformed along the axis of the pipe for obtaining a clad steel pipe of the necessary length.

A practical example of the present invention is explained with reference to the drawings as follows.

Figure 1:
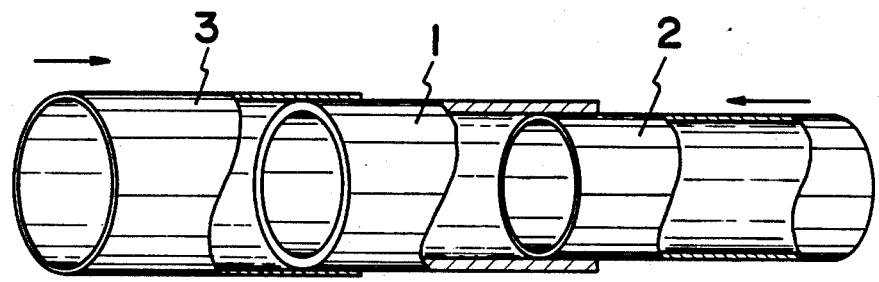
FIG. 1 is a perspective view, partly broken away and in section, of a three-layer pipe being assembled according to the present invention.
Figure 2:
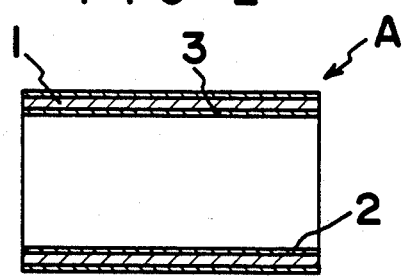
FIG. 2 is a sectional view of a three-layer pipe.
Figure 3:
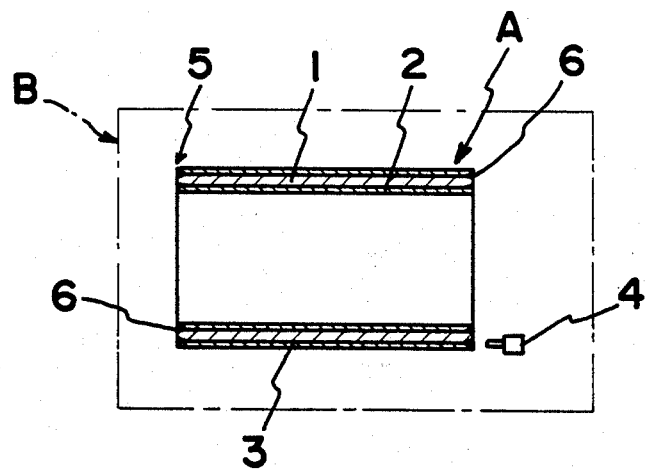
FIG. 3 is a sectional view showing seal welding of the end parts of the three-layer pipe.

FIG. 1 shows a middle pipe 1 made of carbon steel, an inner pipe 2 made of stainless steel and an outer pipe 3 made of titanium which are respectively fixed at room temperature, and which are assembled at a low temperature and at a high temperature as shown in FIG. 1 so that they were fixed under the conditions of room temperature. A three-layer fixed pipe A (FIG. 2) which is mechanically and firmly fixed is obtained as shown in FIG. 2. Next, the three-layer fixed pipe is placed in a well-known electron beam welding apparatus B or another type of welding apparatus. The end parts 5 are seal welded at 6, 6 at the joined end interfaces of the three base pipes 1, 2, 3. The welding is performed by a gun 4 over the whole of both end parts. In this practical example, high vacuum conditions at the whole interfaces are provided before seal welding because of the use of an electron beam welding apparatus, and after seal welding, the vacuum condition is kept high. After that, the three-layer fixed pipe A is placed in a hot isostatic pressing apparatus C as shown in FIG. 4 at a prescribed temperature and prescribed pressure in an argon gas atmosphere, and metallurgical bonding is achieved over the whole interfaces of the base pipes 1, 2, 3 so that a metallurgical joined three-layer pipe body A is obtained. Thereafter, the three-layer pipe body A is extruded by using a die 7 and a mandrel 8 as shown in FIG. 5, whereby a thin and elongated three-layer clad pipe A' is obtained.

In this process, there are not liable to arise wrinkles or protrusions of the pipe because, as described above, in the three-layer pipe body, the three base pipes 1, 2, 3 are metallurgically and tightly bonded together over the whole area before drawing.

Also, with the middle pipe made of carbon steel, the inner pipe made of stainless steel and the outer pipe made of titanium as described above, both end parts of all of them are open as shown in the drawings. The base pipe may have one side of the end parts closed according to the present invention. That is to say, one side of the outer pipe 3 is already closed so that later seal welding is merely needed at the other end part.

The three-layer pipe body A contracts upon cooling after being metallurgically bonded in the hot isostatic pressing apparatus. For instance, in the case where the coefficient of thermal expansion of the outer base pipe is smaller than that of the inner base pipe, the inner side of the base pipe contracts more during cooling, pulling apart of the bonded part of both base pipes results, and therefore the bonding strength is lowered. Therefore, to counteract such a case, the core material is of a coefficient of thermal expansion equal to or smaller than that of the outer base pipe so that the core material suppresses the function of pulling apart the bonded parts of both base pipes. There are the two cases of taking out the core material later or making a hole in the core material and after that, drawing and elongating along the axis by the other way.

After the long three-layer clad pipe is obtained and it is cut into the prescribed unit lengths of pipe, the interfaces of the cut unit pipes are all metallurgically bonded together, and the pipes satisfactorily have the original function. Additionally, it is needless to say that the practical uses of the present invention are not limited to the above-mentioned practical examples. For instance, it is possible to produce not only the three-layer pipe but also a double-layer pipe, and there are various processes such as TIG welding for seal welding or drawn forming in elongating along the axis of the pipe.

Figure 6:
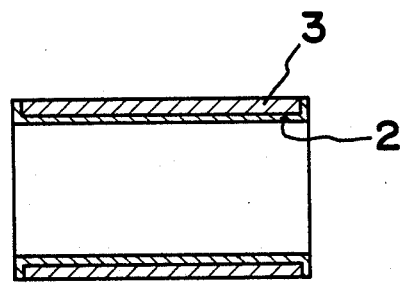
FIGS. 6 and 7 are sectional views showing the deformation of a two-layer pipe.
Figure 7:

Additionally, as described above, a long clad pipe which is elongated and deformed is usually used after cutting to prescribed unit lengths of pipe, but there are cases where a long clad pipe which is elongated and deformed is used as it is. In such a case, for instance, a corrosion resistant base pipe 2 and a carbon steel pipe are respectively used for the inner side and the outer side as shown in FIG. 6. The corrosion resistant base pipe 2 is metallurgically bonded in that both end parts (or one end part) protrudes beyond the outer pipe 3 and is deformed. A product having corrosion resistance at both end parts is obtained as shown in FIG. 7.

As described above, the present invention makes it possible to obtain a clad pipe of which the metallurgical joining is uniformly accomplished at the joined faces over the whole length of a long and thin pipe by using a short and thick base pipe. In addition, joining of the whole faces is easily performed independently of the length and the thickness of the short base pipe. Also, the multiple interfaces of the plural base fixed pipes are diffusion welded at the same time. There is the advantage that the diffusion welding is effective at a low temperature compared with the rolling and welding in the same cases, and this results in less consumed energy. It is possible to use an extrusion forming apparatus as it is, such as for ordinary carbon steel pipes, because the base pipes are completely, metallurgically bonded together by diffusion welding. Imperfections in the products such as wrinkles or breakouts are not caused during elongation and forming, and moreover, there is the advantage that it is possible to form the clad pipe at a low temperature because it is different from forming a clad pipe by rolling and welding.

The term "hot isostatic pressing" (HIP) refers to method and apparatus by which a workpiece is processed under simultaneous application of high pressure and high temperature. HIP method and apparatus are well-known in the prior art. Hot isostatic pressing can solve many technical problems which are impossible to solve by other processes.

As regards the temperatures and pressures of the HIP used in applicant's invention, the temperature and the pressure of the HIP varies depending on the materials of the blanks and may be further varied by the condition of the bonding face, for example, the roughness of the face.

In using, HIP, the temperature is also closely related with the pressure. Thus the pressure is comparatively low at the time that the temperature is high, and the temperature is comparatively low at the time that the pressure is high.

When carbon steel or stainless steel is used as an outer pipe, and the material of the inner pipe is as follows, the temperature and pressure conditions for HIP are as follows:

(1) in the case of Cu: Temperature higher than 750° C., while a temperature higher than 800° C. is preferred.
(2) In the case of Ti: Temperature higher than 800° C., which a temperature higher than 850° C. is preferred.
(3) In the case of Zr: Temperature higher than 750° C., while a temperature higher than 800° C. is preferred.
(4) In the case of stainless steel: Temperature higher than 900° C., while a temperature higher than 1000° C. is preferred.
(5) In the case of a nickel base superalloy such as Inconel or Hastelloy or Cobalt base superalloy such as HA 188: A temperature higher than 900° C., while a temperature higher than 1100° C. is preferred.

It is not necessary to precisely set forth the maximum temperatures; however, it is necessary to be careful that the blanks do not melt. Therefore, the maximum temperature has to be lower than the lowest melting points of the materials which make up the blanks and also lower than eutectic points of such materials. A temperature which is 50° C. lower than the lowest melting points and eutectic points of the blanks is used as the maximum temperature in HIP practice.

As regards the pressure in HIP practice, when carbon steel or stainless steel is used as the outer pipe, the same as above, and various materials are used for the inner pipe, the following pressure are used for HIP as follows:

In the case of Cu in (1), Ti in (2) and Zr in (3), the minimum is 200Kg/cm$^2$, and in the case of stainless steel in (4) and nickel base superalloy or cobalt base superalloy in (5), the minimum is 300 Kg/cm$^2$. It is easy to lower the temperature if the pressure is higher as much as possible, and the coarseness of grains of the materials are alleviated. Therefore, there are not any limitations about the maximum, however, the pressure of HIP furnaces is usually under 1000 Kg/cm$^2$, so that 500–1000Kg/cm$^2$ is desirable. Considering economic conditions, the costs of facilities and operation are expensive when the pressure is high. The pressure at which HIP is put into practical use at the present is about 2000Kg/cm$^2$ maximum, so that the maximum of 2000Kg/cm$^2$ is available. Also, the minimum temperature and pressure mentioned above are operable to provide metallurgical bonding with HIP treatment. And also, even if the materials of an inner and an outer pipe were changed, or even in the case of using three pipes of blanks, the temperature and pressure conditions of the HIP are almost the same. However, it is possible to lower the above-mentioned temperature to 100–200° C. and to lower the pressure if an accelerator such as Cu-P alloy, Ni-P alloy, NI-B alloy of Ni-Cr-B alloy which help to accelerate diffusion bonding of the outer and inner blanks, is thinly interposed between the inner blank and the outer blank.

In the HIP process, the pressure and temperatures are applied for about 1 hour.

The hot isostatic pressing effects metallurgical bonding over the whole interface of the tubular blanks. Thus by using HIP, there are no unbonded zones which would eventually lead to blisters and cracks in the clad pipe. In this regard, heretofore, when attempting to produce a clad pipe of different materials having different properties, imperfections would arise because of the differences in the ductility and the deformation resistance of the various materials used for the blanks. For example, in producing clad pipes used for the oil industry which were bonded by hot working and other than the HIP process, hydrogen ions would enter minute unbonded zones such that blisters would arise in such unbonded zones over a period of time, and these blisters resulted in cracks. Therefore, it is particularly desirable to obtain a complete metallurgical bond between the different materials devoid of any unbonded zones.

According to applicants' invention, it is possible to achieve a 100% bonding between the tubular blanks even when the ductility and deforming resistance between the tubular blanks is quite different from one another such as between high tensile carbon steel and high nickel alloy. Thus, if according to a conventional method, the high tensile carbon steel and high nickel alloy were coaxially assembled and subjected to hot extrusion, there would be a difference in the deforming resistance between the two metals and therefore when the coaxially arranged tubular blanks are extruded, slip occurs between the inner and outer tubular blanks, resulting in eventual imperfections between the juncture of the two tubular blanks, resulting in cracks in the circumferential direction in the high nickel alloy having the large deforming resistance. In addition, the clad pipe results in waving and the control of the thickness becomes difficult.

In applicants' invention, the entire circumferential interface between the tubular blanks is metallurgically bonded by hot isostatic pressing before being elongated. Consequently, it is possible to produce elongated high-quality clad pipe without scars, breakouts or waving, even though the tubular blanks are subject to elongation after the hot isostatic pressing.

In applicants' invention, it is possible to use a very short tubular blank such as one meter or less for eventually producing an elongated clad pipe, for example as long 18 to 24 m. Since the initial tubular blank is short, it is not necessary to use large apparatus for effecting the hot isostatic pressing. In addition, the clad pipe can be produced at a very low cost because known and existing hot isostatic pressing furnaces can be used. The standard length utilized in the oil and gas industries for such clad pipe are between 12 m to 18 m, but long-sized pipes such as 24 m are even more desirable for decreasing the necessity of field welding between the pipes.

One of the advantages of applicants' invention is that a long-sized product is obtained from a short blank, for example, it is possible to elongated a 1 m blank to 18 to 24 m.

The blanks may be elongated more than 3 times, that is, the elongation is such that the cross-sectional area of the pipe is reduced to less than ⅓ its original cross-sectional area. Thus if the cross-sectional area of the pipe before elongation is X, then the cross-sectional area of the pipe after elongating to form the final product would be ⅓ of X. The cross-sectional area referred to is the cross-sectional area of the material of the pipe excluding the hollow center. Thus the final elongated pipe would have a cross-sectional area less than ⅓ of the cross-sectional area of the pipe before elongation.

After the hot isostatic pressing, the pipe may be elongated by various methods including hot extrusion, and utilizing a plug mill, pilger mill, rolling mill, or mandrel mill under hot conditions, or utilizing a pilger mill, rolling mill (roll dies and mandrel), and drawing under cold conditions. Although hot extrusion may be used, it is not necessary to use hot extrusion to effect elongation. Hot extrusion provides a large degree of deformation in one pass, and there is an advantage that the material is metallurgically bonded, but the apparatus is very expensive. The materials themselves, however, are already metallurically bonded during the HIP treatment so that it is not necessary to metallurgically bond the blanks during the step of elongation. Therefore, it is not necessary to use hot extrusion, although it may be used. Hot extrusion requires a large degree of force for metallurgical bonding and there is a large difference between working of materials which are already metallurically bonded and working of materials which are merely mechanically fit. In utilizing hot extrusion, non-uniform thickness can result because a large degree of deformation is effected in one pass. In applicant's invention, it is possible to use other elongating procedures in which the apparatus is not as costly. When using processes such as plug mill or pilger mill, the deformation is slowly observed and it is not necessary to use a large force and it is possible to produce a product having a much more accurate thickness. Also, even in the case of using hot extrusion for elongating, the problem of non-uniformity of thickness of the obtained product is alleviated by having first used the HIP treatment of the blank.

As regards the hot elongating processes, the temperatures may be almost the same as the temperature of the HIP treatment. For example, the hot elongation of carbon steel and nickel base super alloy would be about 1200° C. The elongation utilizing the aforementioned cold methods are effected at room temperature.

In applicants' invention, the complete metallurgical bonding is achieved with high reliability because of the uniform and stable pressure which is applied to the inner and outer pipes by the hot isostatic pressing.

In utilizing hot isostatic pressing, thick diffusion layers may be obtained and the grains of the matrix of the tubular blanks are coarse. However, such thick diffusion layers are subsequently elongated by the elongating process and the grains are thereby refined. Accordingly, the tubular blanks are completely fitted and the roughened diffusion layers are not too thick, such that final clad pipe is very strong and can be reliably and practically used in the oil industry.

Plug mill, pilger mill, and cold drawing are known in the prior art.

What we claim is:

1. A method of producing a clad pipe comprising coaxially assembling a plurality of cylindrical tubular blanks of different metals, seal welding the longitudinal ends of said tubular blanks about the entire circumferential interface of said tubular blanks, maintaining vacuum conditions about said tubular blanks to a temperature of at least 750° C. and a pressure of at least 200 kg/cm² to effect metallurgical bonding over the whole interface of said tubular blanks, and elongating said metallurgically bonded tubular blanks such that the cross-section area thereof is reduced to one-third or less of its pre-elongated cross-section area to thereby produce an elongated clad pipe.

2. A method of producing a clad pipe according to claim 1, wherein said elongated clad pipe is double layer clad pipe.

3. A method of producing a clad pipe according to claim 1, wherein said plurality of tubular blanks comprises an inner tubular blank of stainless steel, an outer tubular blank of titanium and an intermediate tubular blank of carbon steel.

4. A method of producing a clad pipe according to claim 1 wherein said plurality of tubular blanks comprises an inner tubular blank and an outer tubular blank, said inner tubular blank having a coefficient of thermal expansion equal to or less than that of said outer tubular blank.

5. A method of producing a clad pipe according to claim 1 wherein the outer blank is made of a material selected from the group consisting of carbon steel and stainless steel and the inner blank is made of material selected form the group consisting of Cu, Ti, Zr, stainless steel, and a nickel or cobalt base superalloy.

6. A method of producing a clad pipe according to claim 5 wherein said inner blank is copper.

7. A method of producing a clad pipe according to claim 5 wherein the inner blank is Ti and said temperature is at least 800° centigrade.

8. A method of producing a clad pipe according to claim 5 wherein the inner blank is Zr.

9. A method of producing a clad pipe according to claim 5 wherein the inner blank is made of stainless steel and said temperature is at least 900° centigrade and said pressure is at least 300 kg/cm$^2$.

10. A method of producing a clad pipe according to claim 5 wherein the inner blank is made of a nickel base superalloy or a cobalt base superalloy and said temperature of at least 900° centigrade and said pressure is at least 300 kg/cm$^2$.

11. A method of producing a clad pipe according to claim 1 wherein the maximum temperature is at least 50° centigrade lower than the lowest melting point and eutectic point of the blanks.

12. A method of producing a clad pipe according to claim 1 wherein said pressure 500 to 1000 kg/cm$^2$.

13. A method of producting a clad pipe according to claim 1 further comprising applying and interposing between the inner and outer blanks an accelerator to accelerate diffusion bonding of the inner and outer blanks, said accelerator being selected from a group consisting of Cu-P alloy, Ni-P alloy, Ni-B alloy and Ni-Cr-B alloy.

14. A method of producing a clad pipe according to claim 1 wherein the unelongated has a longitudinal length of about one meter or less and the elongated pipe has a longitudinal length of about twelve meters or more.

15. A method of producing a clad pipe according to claim 1 wherein said step of elongating is effected by utilizing hot extrusion, plug mill, pilger mill, rolling mill, or mandrel mill under hot conditions.

16. A method of producing a clad pipe according to claim 1 wherein said elongating step is effected utilizing a pilger mill, rolling mill with roll dies and mandrel and drawing at room temperature.

17. A method of producing a clad pipe according to claim 15 wherein said step of elongating is effected at a temperature corresponding to the temperature at which the hot isostatic pressing is effected.

18. A method according to claim 1, wherein said step of simultaneously subjecting said tubular blanks to a temperature of at least 750° C. and a pressure of at least 200 kg/cm$^2$ comprises placing said assembled blanks within a hot isostatic press enclosure in which the entire assembled blanks are enclosed by said enclosure, heating the entire assembled blanks simultaneously to said temperature of at least 750° C. in said enclosure, and simultaneously subjecting the entire assembled blanks including the inside and outside of the assembled blanks to said pressure of at least 200 kg/cm$^2$ in said enclosure.

19. A method according to claim 18 further comprising producing a thick diffusion layer of coarse grains at the matrix of said assembled blanks during said step of simultaneously heating and pressurizing said assembled blanks, and reducing the thickness of said diffusion layer and refining said coarse grain by elongating said diffusion layer during said elongating step.

20. A method of producing corrosion and wear resistant clad pipes for use in the oil industry to transport oil and the like comprising assembling a plurality of cylindrical tubular blanks of dissimilar metals having different ductibility and different deforming resistance, seal welding the longitudinal ends of said blanks, placing the entire assembled blanks within a hot isostatic press enclosure, simultaneously heating for about one hour the entire assembled blanks to a temperature of at least 750° C. in said enclosure, simultaneously with said heating, pressurizing for about one hour the entire assembled blanks including the inside and outside of the assembled blank to a pressure of at least 200 kg/cm$^2$ in said enclosure, providing a one hundred percent metallurgical bond between said blanks and a thick diffusion layer of coarse grains at the matrix of said assembled blanks during said steps of simultaneously heating and pressurizing said assembled blanks in said enclosure, removing said metallurgically bonded blanks form said enclosure, elongating said metallurgically bonded blanks such that the cross-section area of the metallurgically bonded blanks is reduced to one-third or less of its pre-elongated cross-section area, said step of elongating said metallurgically bonded blanks comprising simultaneously elongating said diffusion layer, reducing the thickness of said diffusion layer, and refining said coarse grain in said diffusion layer, thereby producing a strong, corrosion resistant and wear resistant clad pipe suitable for use in the oil industry.

21. A method according to claim 20 wherein said elongating is effected at room temperature.

22. A method according to claim 20 comprising effecting said simultaneous heating and pressurizing step in argon atmosphere.

23. A method according to claim 20 wherein said step of assembling a plurality of cylindrical tubular blanks comprises assembling at least three cylindrical tubular blanks.

24. A method of producing a clad pipe comprising coaxially assembling inner and outer cylindrical tubular blanks, forming a radial projection on at least one longitudinal end of said inner tubular blank such that said projection abut one longitudinal end of said outer tubular blank, simultaneously subjecting said tubular blanks to a temperature of at least 750° C. and a pressure of at least 200 kg/cm$^2$, and elongating said metallurgically bonded inner and outer tubular blanks such that the cross-section area thereof is reduced one-third or less of its pre-elongated cross-section area to thereby produce an elongated clad pipe.

25. A method of producing a clad pipe according to claim 24, further comprising forming a radial projection on the other longitudinal end of said inner tubular blank such that the last said projection abuts the other longitudinal end of said outer tubular blank.

26. A method according to claim 24, wherein said step of simultaneously subjecting said tubular blanks to a temperature of at least 750° C. and a pressure of at least 200 kg/cm² comprises placing said assembled blanks within a hot isostatic press enclosure in which the entire assembled blanks are enclosed by said enclosure, heating the entire assembled blanks simultaneously to said temperature of at least 750° C. in said enclosure, and simultaneously subjecting the entire assembled blanks including the inside and outside of the assembled blanks to said pressure of at least 200 kg/cm² in said enclosure.

27. A method according to claim 26 further comprising producing a thick diffusion layer of coarse grains at the matrix of said assembled blanks during said step of simultaneously heating and pressurizing said assembled blanks, and reducing the thickness of said diffusion layer and refining said coarse grain by elongating said diffusion layer during said elongating step.

* * * * *